United States Patent
Noda et al.

(10) Patent No.: US 8,075,805 B2
(45) Date of Patent: Dec. 13, 2011

(54) METHOD FOR PRODUCING CONDUCTIVE MASTERBATCH

(75) Inventors: Kazuya Noda, Tokyo (JP); Takaaki Miyoshi, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 703 days.

(21) Appl. No.: 11/990,141

(22) PCT Filed: Sep. 4, 2006

(86) PCT No.: PCT/JP2006/317433
§ 371 (c)(1),
(2), (4) Date: Feb. 7, 2008

(87) PCT Pub. No.: WO2007/029634
PCT Pub. Date: Mar. 15, 2007

(65) Prior Publication Data
US 2010/0155673 A1    Jun. 24, 2010

(30) Foreign Application Priority Data

Sep. 5, 2005 (JP) ................. 2005-256758

(51) Int. Cl.
H01B 1/04 (2006.01)
H01B 1/06 (2006.01)
C04B 35/00 (2006.01)
B60C 1/00 (2006.01)

(52) U.S. Cl. ......... 252/502; 252/511; 264/105; 524/495

(58) Field of Classification Search ............... 252/502, 252/511; 264/105; 524/495
See application file for complete search history.

(56) References Cited

U.S. PATENT DOCUMENTS

| | | | |
|---|---|---|---|
| 3,257,357 A | 6/1966 | Stamatoff | |
| 3,257,358 A | 6/1966 | Stamatoff | |
| 3,306,874 A | 2/1967 | Hay | |
| 3,306,875 A | 2/1967 | Hay | |
| 3,929,930 A | 12/1975 | Izawa et al. | |
| 4,011,200 A | 3/1977 | Yonemitsu et al. | |
| 5,591,382 A | 1/1997 | Nahass et al. | |
| 6,265,472 B1 * | 7/2001 | Fujii et al. | 524/88 |
| 6,866,798 B2 | 3/2005 | Miyoshi et al. | |
| 6,942,823 B2 * | 9/2005 | Terada et al. | 252/511 |
| 7,914,708 B2 * | 3/2011 | Tobori et al. | 252/511 |
| 2003/0116757 A1 | 6/2003 | Miyoshi et al. | |
| 2004/0068037 A1 | 4/2004 | Mitadera et al. | |
| 2004/0082729 A1 | 4/2004 | Terada et al. | |
| 2004/0238793 A1 | 12/2004 | Hossan et al. | |
| 2005/0199859 A1 * | 9/2005 | Terada et al. | 252/500 |
| 2007/0060719 A1 * | 3/2007 | Clement et al. | 525/524 |

FOREIGN PATENT DOCUMENTS

| | | |
|---|---|---|
| EP | 0 685 527 A1 | 6/1994 |
| EP | 0747439 A2 | 12/1996 |
| JP | 50-51197 A | 5/1975 |
| JP | 52-17880 B | 5/1977 |
| JP | 63-152628 A | 6/1988 |
| JP | 2-201811 A | 8/1990 |
| JP | 8-48869 A | 2/1996 |
| JP | 8-508534 A | 9/1996 |
| JP | 9-124926 A | 5/1997 |
| JP | 2001-302911 A | 10/2001 |
| JP | 2004-2898 A | 1/2004 |
| JP | 2005-200664 A | 7/2005 |
| WO | WO 94/23433 A1 | 10/1994 |
| WO | WO-2004/060980 A1 | 7/2004 |
| WO | WO 2004/106421 A1 | 12/2004 |
| WO | WO 2005000963 A1 * | 1/2005 |
| WO | WO 2006049139 A1 * | 5/2006 |

OTHER PUBLICATIONS

Extended European Search Report dated Apr. 14, 2010 for corresponding European Application No. 06797358.6.

* cited by examiner

*Primary Examiner* — Mark Kopec
*Assistant Examiner* — Jaison Thomas
(74) *Attorney, Agent, or Firm* — Birch, Stewart, Kolasch & Birch, LLP

(57) ABSTRACT

The present invention relates to a method for producing a conductive masterbatch containing a polyamide resin and a carbonaceous filler. The present invention provides a method for producing a conductive masterbatch which can suppress an increase in resin temperature during extrusion, formation of die drips, and strand breakage and can also significantly increase the output of extruding. The method is achieved by the steps of feeding the carbonaceous filler to a molten first polyamide to melt-knead them together and then feeding a second polyamide to the resulting melt-kneaded product to further melt-knead the second polyamide, the carbonaceous filler, and the first polyamide.

12 Claims, No Drawings

METHOD FOR PRODUCING CONDUCTIVE MASTERBATCH

TECHNICAL FIELD

The present invention relates to a method for producing a conductive masterbatch which can suppress an increase in resin temperature during extrusion, a formation of die drips, and strand breakage and can also significantly increase the output of extruding. Moreover, by the use of the conductive masterbatch obtained by the production method according to the present invention, it is possible to obtain a conductive resin composition excellent in conductivity (a conductivity which is comparable or superior to that of a conventional material for use in a processing involving an electrostatic coating, i.e., conductivity sufficient for a material to be electrostatically coated) and surface appearance.

Such a conductive resin composition can be used in a wide variety of fields, such as electric and electronic parts, parts of office automation machines, automobile parts and other mechanical parts. Especially, the above conductive resin composition is very advantageous as a material for producing an automobile outer panel (e.g., an automobile fender).

BACKGROUND ART

Polyphenylene ethers not only have excellent mechanical and electrical properties and excellent heat resistance, but also have excellent dimensional stability. Therefore, polyphenylene ethers have been used in a wide variety of fields. However, the moldability of polyphenylene ether is poor. Nowadays, polyamide-polyphenylene ether alloys, in which this disadvantage, moldability, has been improved, are used in a wide variety of fields.

Recently, use of a conductivity-imparted polyamide-polyphenylene ether alloy is rapidly expanding in the fields of automobile outer panels (such as a fender and a door panel) as an electrostatically coatable material. For example, it has been attempted to use an automobile fender made of a polyamide-polyphenylene ether alloy for the purpose of improving not only the safety of automobiles (e.g., protection of pedestrians) but also the ability of an automobile fender to recover from distortion.

Generally, in order to produce a conductive resin, a resin is mixed with a carbonaceous filler such as carbon black. For example, with respect to a technique for imparting conductivity to a polyamide-polyphenylene ether alloy, there is disclosed a conductive masterbatch comprising conductive carbon black present in the form of at least one agglomerated particle having a major axis of 20 to 100 μm, wherein the number of the agglomerated particle(s) is 1 to 100 (Patent Document 1). Further, there is disclosed a technique to obtain a conductive resin mixture by uniformly dispersing carbon black in a polyamide in advance, followed by mixing thereof with a polyphenylene ether (Patent Document 2). There is disclosed a technique in which a polyamide and a polyphenylene ether are compatibilized with each other in advance, followed by addition of carbon black, to thereby obtain a resin composition having good impact strength, good melt-fluidity, and good (low) volume resistivity (Patent Document 3).

There is disclosed a method of obtaining a conductive masterbatch by a method of adding a solid resin and carbon fibril to an extruder or the like simultaneously, followed by mixing thereof (Patent Document 4). Further, there is disclosed a method of adding carbon black to a polyamide resin that is melted in advance, followed by mixing thereof (Patent Document 5). There is disclosed a method of obtaining a conductive masterbatch by mixing a first polyamide powder with carbon black in advance and then compounding this polyamide powder/carbon black mixture with a second resin (Patent Document 6).

However, these techniques are all lab scale techniques using small extruders, and they do not take into consideration of the production of a conductive masterbatch in large quantities stably for a long time by means of a large extruder. Generally, when a conductive masterbatch is produced for a long time using a large extruder, decomposition of resin is promoted by an increase in resin temperature and die drips (a lump of resin which grows at the die exit of an extruder with time) are formed in large quantities. A formation of the die drips poses problems. For example, the die drips cause strand breakage when a certain size is reached, or the die drips are carried with a strand and mixed into a product pellet. Furthermore, the strand breakage by the poor distribution of a carbonaceous filler also occurs.

As described above, it was difficult to produce a conductive masterbatch stably for a long time using a large extruder, and the die drips and the poor distribution of a carbonaceous filler were major factors to reduce productivity.

[Patent Document 1] WO 04/60980
[Patent Document 2] JP-A-2-201811
[Patent Document 3] JP-A-8-48869
[Patent Document 4] National Publication of International Patent Application No. 8-508534
[Patent Document 5] JP-A-2004-2898
[Patent Document 6] U.S. Pat. No. 2004-0238793

DISCLOSURE OF THE INVENTION

As described above, the conductive masterbatch containing a polyamide and a carbonaceous filler is melt-kneaded with a polyphenylene ether for producing a conductive resin composition comprising a polyamide-polyphenylene ether alloy with a carbonaceous filler contained therein.

An object of the present invention is to suppress an increase in resin temperature during extrusion, a formation of die drips, and strand breakage, and also to provide a production method capable of significantly increase the output of extruding, when producing the conductive masterbatch from a polyamide and a carbonaceous filler.

Another object of the present invention is to provide the above conductive masterbatch.

A still another object of the present invention is to provide a method for efficiently producing the conductive resin composition using the above conductive masterbatch.

A still another object of the present invention is to provide the above conductive resin composition.

The present inventors have made intensive studies with a view toward solving the above problems. As a result, it was surprisingly found that, in the production of a conductive masterbatch containing a polyamide resin and a carbonaceous filler, it was possible not only to suppress an increase in resin temperature during extrusion and suppress a formation of die drips and strand breakage, but also to significantly increase the output of extruding by employing a production method comprising a first step of melt-kneading a first polyamide and a carbonaceous filler and a second step of melt-kneading the melt-kneaded product and a second polyamide in this order. The present invention has been completed based on these findings.

Next, for easy understanding the present invention, the essential features and various preferred embodiments of the present invention are enumerated below.

1. A method for producing a conductive masterbatch comprising a polyamide resin and a carbonaceous filler, characterized by comprising a first step of melt-kneading a first polyamide and the carbonaceous filler to form a melt-kneaded product and a second step of melt-kneading the melt-kneaded product and a second polyamide, in this order.
2. The method for producing the conductive masterbatch according to the above 1, wherein the first step comprises the steps of melting the first polyamide and adding the carbonaceous filler to the molten first polyamide to further melt-knead the resulting mixture, in this order.
3. The method for producing the conductive masterbatch according to the above 1, characterized in that a twin-screw extruder equipped with three respective inlets located at least in the upstream portion, intermediate portion, and downstream portion thereof is used so that a first polyamide resin is fed through the inlet at the upstream portion to melt the first polyamide resin; then, the carbonaceous filler is fed through the inlet at the intermediate portion to knead the carbonaceous filler and the first polyamide resin together; and then, the second polyamide is fed through the inlet at the downstream portion to melt-knead the second polyamide, the carbonaceous filler, and the first polyamide together.
4. The method for producing the conductive masterbatch according to the above 1, characterized in that an extruder is used which has a screw outside diameter of 40 mm or more.
5. The method for producing the conductive masterbatch according to the above 3, characterized in that a mixture of the first polyamide, the second polyamide, and the carbonaceous filler is passed through two or more kneading zones provided in the extruder to thereby melt-knead the mixture.
6. The method for producing the conductive masterbatch according to the above 3, characterized in that an extruder is used which is equipped with an open vent further downstream of the inlet at the downstream portion for feeding the second polyamide.
7. The method for producing the conductive masterbatch according to the above 3, characterized in that the conductive masterbatch is produced at the output of extruding of 150 kg/hr or more.
8. The method for producing the conductive masterbatch according to the above 1, wherein the water contents of the first polyamide and the second polyamide are 500 ppm or more and 2,000 ppm or less, respectively.
9. The method for producing the conductive masterbatch according to the above 6, characterized in that both the first polyamide and the second polyamide are in the form of pellets; the second polyamide has an average pellet length of from 1.0 mm to 4.0 mm; and the pellets have an average diameter in cross-section of from 0.5 mm to 3.0 mm.
10. The method for producing the conductive masterbatch according to the above 1, characterized in that the quantitative ratio of the first polyamide to the second polyamide is from 9:1 to 4:6.
11. The method for producing the conductive masterbatch according to the above 1, characterized in that the terminal amino group/terminal carboxyl group ratio of both the first polyamide and the second polyamide is from 0.1 to 0.6.
12. The method for producing the conductive masterbatch according to the above 1, characterized in that the carbonaceous filler is carbon black and/or carbon fibril.
13. The method for producing the conductive masterbatch according to the above 1, characterized in that 8 to 15% by weight of the carbonaceous filler is incorporated relative to the total weight of the conductive masterbatch.
14. A conductive masterbatch obtained by the method for producing the conductive masterbatch according to the above 1.
15. A method for producing a conductive resin composition comprising polyamide, polyphenylene ether, and a carbonaceous filler comprising the steps of:
  (1) producing the conductive masterbatch wherein a twin-screw extruder equipped with three respective inlets located at least in the upstream portion, intermediate portion, and downstream portion thereof is used so that a first polyamide resin is fed through the inlet at the upstream portion to melt the first polyamide resin; then, the carbonaceous filler is fed through the inlet at the intermediate portion to knead the carbonaceous filler and the first polyamide resin together; and then, a second polyamide is added through the inlet at the downstream portion to melt-knead the second polyamide, the carbonaceous filler, and the first polyamide together; and
  (2) melt-kneading the resulting conductive masterbatch with polyphenylene ether or with polyphenylene ether and an additional amount of polyamide.
16. The method for producing the conductive resin composition according to the above 15, characterized in that the step of (2) comprises the steps of: melting the polyphenylene ether; and adding the conductive masterbatch obtained in the step of (1) and the additional amount of polyamide simultaneously to the molten polyphenylene ether.
17. A conductive resin composition obtained by the method for producing the conductive resin composition according to the above 15.

The present invention can provide a method for producing a conductive masterbatch which can suppress an increase in resin temperature during extrusion, a formation of die drips, and strand breakage and can also significantly increase the output of extruding. Moreover, by the use of the conductive masterbatch according to the present invention, it is possible to provide a conductive resin composition excellent in conductivity (a conductivity which is comparable or superior to that of a conventional material for use in a processing involving an electrostatic coating, i.e., conductivity sufficient for a material to be electrostatically coated) and surface appearance.

BEST MODE FOR CARRYING OUT THE INVENTION

The foregoing and other objects, features and advantages of the present invention will be apparent from the following detailed description and the appended claims.

Hereinbelow, the components of the conductive masterbatch and conductive resin composition of the present invention will be described in detail.

With respect to the type of the first polyamide and the second polyamide which can be used in the present invention, there is no particular limitation so long as it is a polymer having amide {—NH—C(=O)—} bond in a main chain thereof.

In general, a polyamide can be obtained by ring-opening polymerization of a lactam, condensation polymerization of a diamine and a dicarboxylic acid, and condensation polymerization of an aminocarboxylic acid. However, in the present invention, the method for obtaining a polyamide is not limited to these examples.

The diamines as described above are broadly divided into aliphatic diamines, alicyclic diamines and aromatic diamines. Specific examples of diamines include tetramethylene diamine, hexamethylene diamine, undecamethylene diamine, dodecamethylene diamine, tridecamethylene diamine, 1,9-nonanediamine, 2-methyl-1,8-octanediamine, 2,2,4-trimethylhexamethylene diamine, 2,4,4-trimethylhexamethylene diamine, 5-methylnonamethylene diamine, 1,3-bis(aminomethyl)cyclohexane, 1,4-bis(aminomethyl)cyclohexane, m-phenylene diamine, p-phenylene diamine, m-xylylene diamine and p-xylylene diamine.

Dicarboxylic acids are broadly divided into aliphatic dicarboxylic acids, alicyclic dicarboxylic acids and aromatic dicarboxylic acids. Specific examples of dicarboxylic acids include adipic acid, suberic acid, azelaic acid, sebacic acid, dodecanoic diacid, 1,1,3-tridecanoic diacid, 1,3-cyclohexane dicarboxylic acid, terephthalic acid, isophthalic acid, naphthalene di-carboxylic acid and a dimer acid.

Specific examples of lactams include ε-caprolactam, enanthlactam and ω-laurocaprolactam.

Further, specific examples of aminocarboxylic acids include ε-aminocaproic acid, 7-aminoheptanoic acid, 8-aminooctanoic acid, 9-aminononanoic acid, 11-aminoundecanoic acid, 12-aminododecanoic acid and 13-aminotridecanoic acid.

In the present invention, the polyamide may either be a homopolymer or a copolymer obtained by subjecting the above-described lactams, diamines, dicarboxylic acids and ω-aminocarboxylic acids to condensation polymerization, individually or as a mixture of two or more thereof, respectively.

Moreover, a high molecular weight polyamide can suitably be used which is obtained by polymerizing any of the above-described lactams, diamines, dicarboxylic acids and ω-aminocarboxylic acids in a polymerization reactor to thereby obtain a low molecular weight oligomer and further polymerizing the obtained oligomer in an extruder or the like to thereby obtain a high molecular weight polymer.

Examples of polyamides which can be advantageously used in the present invention include polyamide 6, polyamide 6,6, polyamide 4,6, polyamide 11, polyamide 12, polyamide 6,10, polyamide 6,12, polyamide 6/6,6, polyamide 6/6,12, polyamide MXD (m-xylylene diamine), 6, polyamide 6,T, polyamide 6,I, polyamide 6/6,T, polyamide 6/6,I, polyamide 6,6/6,T, polyamide 6,6/6,I, polyamide 6/6,T/6,I, polyamide 6,6/6,T/6,I, polyamide 6/12/6,T, polyamide 6,6/12/6,T, polyamide 6/12/6,I, polyamide 6,6/12/6,I, and polyamide 9,T (I is the abbreviation of isophthalic acid; and T is the abbreviation of terephthalic acid). Further, it is also possible to use a polyamide obtained by copolymerizing two or more polyamides using an extruder or the like. Preferred polyamides include polyamide 6, polyamide 6,6, polyamide 6/6,6, polyamide 9, T and a mixture thereof.

A preferred viscosity range of polyamides which can be used in the present invention is from 90 to 160 ml/g, more preferably from 100 to 150 ml/g in terms of the viscosity number measured in 96% sulfuric acid according to ISO 307. In order to suppress the strand breakage during the conductive masterbatch production, the viscosity number is preferably 90 ml/g or more, and in order to suppress decomposition, the viscosity number is preferably 150 ml/g or less.

In the present invention, it is possible to use a mixture of two or more polyamides which belong to the same type of polyamide and have different viscosity numbers. Examples of the mixtures include a mixture of a polyamide having a viscosity number of 170 ml/g with a polyamide having a viscosity number of 80 ml/g and a mixture of a polyamide having a viscosity number of 120 ml/g with a polyamide having a viscosity number of 115 ml/g.

A particularly preferred mixture among the polyamide mixtures is the one in which each polyamide is within the range of a viscosity number of 90 to 160 ml/g and has a different viscosity number.

The viscosity number of these mixtures can be determined by dissolving each polyamide in 96% sulfuric acid in the mass ratio to be mixed and measuring the viscosity number according to ISO 307.

Further, the first polyamide and the second polyamide used in the present invention may be either polyamides having the same viscosity number or those having different viscosity numbers.

A polyamide generally has an amino group and a carboxyl group as terminal groups thereof. The amino group/carboxyl group concentration ratio of the first polyamide and the second polyamide used in the present invention is preferably from 0.1 to 5.0, more preferably from 0.1 to 0.9, further preferably from 0.1 to 0.6, most preferably from 0.1 to 0.25.

Further, the terminal amino group/terminal carboxyl group ratio of the first polyamide and the second polyamide used in the present invention may be the same or different.

Further, the concentration of terminal amino groups is preferably at least 10 micromol/g, more preferably 10 micromol/g or more and 40 micromol/g or less.

The concentration of terminal carboxyl groups is preferably at least 90 micromol/g, more preferably 90 micromol/g or more and 130 micromol/g or less.

Any conventional methods apparent to those skilled in the art can be used to control the amounts of the terminal groups of the polyamides. For example, there can be mentioned a method in which at least one selected from among diamine compounds, monoamine compounds, dicarboxylic acid compounds, monocarboxylic acid compounds, and the like is added to the polymerization reaction system for producing a polyamide resin so as to obtain a polyamide having a desired terminal amino group concentration.

Further, the polyamide used in the present invention preferably has a water content in the range of from 500 ppm or more and 3,000 ppm or less, more preferably from 500 ppm or more and 2,000 ppm or less. In order to suppress the formation of die drips during the masterbatch production, the water content is preferably 500 ppm or more, and in order to suppress the decomposition of resin during production, the water content is preferably 3,000 ppm or less.

The greatest feature of the present invention is to separately feed a polyamide to an extruder by dividing it into at least two parts, a first polyamide and a second polyamide. The energy to melt a resin in an extruder is brought about by two types, the heat transmission of the thermal energy from a heated cylinder and the mechanical energy (kneading energy) by a rotating screw. It is known that crystalline resin generally has a melting point and the amount of heat required for melting the resin is large. As for the energy required for the melting, the energy brought about by the mechanical energy (kneading energy) from a rotating screw is larger than the heat transmission of the thermal energy from a cylinder. By separately feeding a polyamide, the mechanical energy required for melting the polyamide is reduced, and it becomes possible to significantly reduce the motor load required for the production. Moreover, in the second step in which a melt-kneaded product from the first step is further melt-kneaded with a second polyamide, the following effects can be obtained: the second polyamide takes the thermal energy carried by the melt-kneaded product from the first step to facilitate its melting and allow the resin temperature of the whole molten resin in the extruder to be significantly reduced.

The first polyamide and the second polyamide used in the present invention may be the same or different.

Further, the quantitative ratio of the first polyamide to the second polyamide (the amount of the first polyamide: the amount of the second polyamide) used in the present invention is preferably from 9:1 to 4:6, more preferably from 7:3 to 5:5, further preferably from 6:4 to 5:5. The quantitative ratio in the above-described range can suppress an increase in resin temperature during extrusion, a formation of die drips, and strand breakage and can also significantly increase the output of extruding.

The first polyamide and the second polyamide that can be used in the present invention are preferably in the form of pellets. The cross-section of the polyamide pellet perpendicular to the longitudinal direction may have a circular shape or an elliptical shape. Further, the pellet may have a cylindrical shape, an elliptic cylindrical shape, or a spherical shape, and in particular, it is preferred that it has a cylindrical shape or an elliptic cylindrical shape. The polyamide used in the present invention being in the form of pellets allows easy handling of the polyamide and easy feeding thereof to an extruder and also exhibits an effect on the stability of feeding. In order also to previously prevent problems such as scattering at a feed port and flushing in a feeder, it is preferred not to use a granular polyamide but to use a polyamide in the form of pellets.

Among the polyamide pellets used in the present invention, particularly the second polyamide pellets that are melt-kneaded in the second step preferably have a pellet average length of from 1.0 mm to 4.0 mm, preferably from 1.0 mm to 3.0 mm, and an average cross-sectional diameter of from 0.5 mm to 3.0 mm, preferably from 0.5 mm to 2.8 mm, as measured by the following method.

Controlling the pellet average length and average diameter in the specific range or more can suppress air entrainment into an extruder and can bring about an effect to suppress the oxidative degradation of the polymer, resulting in reduction of the occurrence frequency of troubles such as strand breakage. Further, controlling the pellet average length and average diameter in the specific range or less allows the pellets to be melted promptly in an extruder, improves the dispersibility of carbon fillers into polyamides, and allows the torque of the extruder during production to be suppressed, thereby bringing about an effect to greatly improve the productivity.

In the present invention, the pellet average length is calculated by taking out any 50 pellets, measuring the length of each pellet with a slide caliper, and taking the average of the length of all the pellets. Further, in the present invention, the average cross-sectional diameter of pellets is calculated by taking out any 50 pellets, measuring the maximum diameter (major axis in the case of an ellipse) and the minimum diameter (minor axis in the case of an ellipse) of each pellet with a slide caliper, taking the average of these values, and taking the average of the diameter of all the pellets.

Further, for improving the heat stability of a polyamide resin, a metal compound stabilizer as described in JP-A-1-163262 and the like which are publicly known can also be used satisfactorily.

Among the conventional metal compound stabilizers, especially preferred are CuI, $CuCl_2$, copper acetate and cerium stearate. Also preferred are halogen salts of alkali metals, such as potassium iodide and potassium bromide. These metal compound stabilizers can be used individually or in combination.

It is preferred that the metal compound stabilizer and/or halogen salt of alkali metals is added to the polyamide resin in an amount of 0.001 to 1 part by mass in total, relative to 100 parts by mass of the polyamide resin.

Further, any of other conventional additives for a polyamide may also be added to the polyamide. Such additives can be used in an amount of less than 10 parts by mass, relative to 100 parts by mass of the polyamide.

Next, the carbonaceous filler which can be used in the present invention is described. Examples of the carbonaceous filler include carbon black, carbon fibril, carbon fiber, and carbon nanofiber. Among others, carbon black and carbon fibril are preferred.

A specific example of the carbon black which can be used in the present invention is a conductive carbon black, which preferably has a dibutyl phthalate (DBP) absorption of 250 ml/100 g or more, more preferably a DBP absorption of 300 ml/100 g or more, further preferably 350 ml/100 g or more. The upper limit of the DBP absorption is not particularly limited, but it is 850 ml/g or less. The DBP absorption as described herein is a value measured by a method provided in ASTM D2414. Further, the conductive carbon black which can be used in the present invention preferably has a BET surface area of 200 $cm^2$/g or more, more preferably 400 $cm^2$/g or more. Examples of commercially available conductive carbon black include Ketchen black EC and Ketchen black EC-600JD available from Ketchen Black International Co.

Examples of the carbon fibril which can be used in the present invention include a fine carbon fiber and the like described in WO 94/023433. Among others, a carbon fibril having a mean fiber diameter of 75 nm or less and an L/D of 5 or more is preferred. Examples of commercially available carbon fibrils include BN fibril available from Hyperion Catalysis International, Inc.

In the present invention, it is preferred to blend from 8 to 15% by weight of a carbonaceous filler relative to the total weight of a conductive masterbatch, more preferably from 8 to 12% by weight.

Next, the production method which is the gist of the present invention is described in detail.

As described in the claims, the present invention relates to a method for producing a conductive masterbatch containing a carbonaceous filler and a polyamide resin and needs to have at least two steps. The first step is a step of melt-kneading a first polyamide and the carbonaceous filler, and the second step is a step of melt-kneading the melt-kneaded product obtained in the first step and a second polyamide. In addition, it is required to include these two steps in this order.

In the present invention, it is preferred to divide the first step into two steps in order to improve the dispersibility of the conductive filler. Specifically, these two steps comprise a step of melting the first polyamide and a step of feeding the carbonaceous filler to the molten polyamide to melt-knead them.

Specific examples of processing apparatuses for producing the conductive masterbatch of the present invention include a single screw extruder, a twin-screw extruder, a high-speed non-intermeshing counterrotating twin screw super-kneading mixer (HTM twin screw continuous kneading extruder), a roll, a kneader, a Brabender plastograph, and a Banbury mixer.

The production method of the present invention exhibits its effect more significantly when a large extruder with high productivity is used. Specifically, in the conventional production method, a large extruder had a problem in productivity and there were many cases to which a large extruder cannot be satisfactorily applied. However, the production method of the present invention has a feature that the production can be performed satisfactorily regardless of a screw diameter.

From the viewpoint mentioned above, it is apparent that the production method of the present invention is more suitable to an extruder with a large screw diameter in consideration of productivity. Specifically, the extruder is a twin-screw extruder having an outside diameter of 40 mm or more. The twin-screw extruder more preferably has a screw outside diameter of from 40 mm or more and 150 mm or less, further preferably from 50 mm or more to 150 mm or less.

The output of extruding for melt-kneading the polyamide and the carbonaceous filler is preferably 150 kg/hr or more, more preferably 200 kg/hr or more, further preferably 250 kg/hr or more, from a viewpoint of productivity. Particularly, the effect of the present invention is exhibited significantly when the output of extruding is increased.

Further, the most preferred equipment embodiment of such twin-screw extruders is a twin-screw extruder equipped with inlets at least at three places, an upstream portion, an intermediate portion, and a downstream portion, of the extruder.

As a particularly preferred form of a production method of the present invention, there can be mentioned a form of using a twin-screw extruder equipped with inlets at least at three places, an upstream portion, an intermediate portion, and a downstream portion, of the extruder, wherein a first polyamide resin is fed through the inlet at an upstream portion to melt the first polyamide resin; then, a carbonaceous filler is fed through the inlet at an intermediate portion to melt-knead the carbonaceous filler and the first polyamide resin together; and then, a second polyamide is added from the inlet at a downstream portion to melt-knead the second polyamide, the carbonaceous filler, and the first polyamide together. Further, at this time, in order to release the air that is entrained at the time of feeding a carbonaceous filler from the inlet at an intermediate portion, it is preferred to provide an oven vent at least at a place between the inlet at an intermediate portion and the inlet at a downstream portion or further downstream of the downstream inlet for feeding the second polyamide. More preferably, the open vent is provided at a place further downstream of the downstream inlet for feeding the second polyamide.

A molten resin temperature for melt-kneading the polyamide and the carbonaceous filler is not particularly limited, but a typical condition where a suitable composition can be obtained is arbitrarily selected from temperatures between 200 and 350° C. The molten resin temperature during extrusion is preferably 340° C. or less. Further, the molten resin temperature after the carbonaceous filler is added is preferably lower by 10 to 30° C. than that before the carbonaceous filler is added, more preferably lower by 15 to 25° C. Furthermore, a die temperature is preferably set close to the molten resin temperature.

In the present invention, it is preferred that a mixture of the first polyamide, the second polyamide, and the carbonaceous filler is kneaded by passing through two or more kneading zones. The kneading zone as described in the present invention is a portion constituted by a combination of two or more kneading blocks. The kneading may be performed by providing two or more kneading zones in one processing step or by passing through a processing apparatus provided with one kneading zone two or more times. Preferred is a method of kneading the thermoplastic resin and the carbonaceous filler by providing two or more kneading zones in one processing step. Providing two or more kneading zones in one processing step refers to providing a full-flight screw after the first kneading zone and further providing the second kneading zone, from the upstream toward the downstream.

The order of charging the polyamide resin is not limited at all as long as the requirement of the present invention is satisfied. Further, the remaining polyamide may be fed at the further downstream of the inlet at a downstream portion.

The conductive resin composition of the present invention can be obtained by melt-kneading the conductive masterbatch of the present invention and polyphenylene ether and optionally an additional amount of polyamide.

Examples of polyphenylene ethers which can be used for the conductive resin composition of the present invention include a homopolymer and/or a copolymer, each independently comprising a structural unit represented by the formula (1):

[Formula 1]

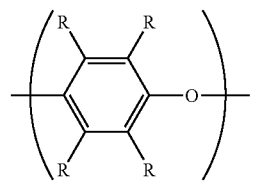

wherein O represents an oxygen atom, and each R independently represents hydrogen, halogen, primary or secondary lower alkyl, phenyl, haloalkyl, aminoalkyl, hydrocarbyloxy or halohydrocarbyloxy (in which at least two carbon atoms are present between the halogen atom and the oxygen atom).

Specific examples of polyphenylene ethers used in the present invention include poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether). Further examples of polyphenylene ethers include a copolymer of 2,6-dimethylphenol and another phenol (for example, a copolymer of 2,6-dimethylphenol and 2,3,6-trimethylphenol and a copolymer of 2,6-dimethylphenol and 2-methyl-6-butylphenol, which are described in JP-B-52-17880).

Among the above-described polyphenylene ethers, preferred are poly(2,6-dimethyl-1,4-phenylene ether), a copolymer of 2,6-dimethylphenol and 2,3,6-trimethylphenol, and a mixture thereof. When using the copolymer of 2,6-dimethylphenol and 2,3,6-trimethylphenol as a polyphenylene ether, the amount of 2,3,6-trimethylphenol in the polyphenylene ether is preferably from 20 to 35% by mass (relative to 100% by mass of all the polyphenylene ether).

The method for producing the polyphenylene ether used in the present invention is not particularly limited as long as it is obtained by conventional methods. For example, there can be mentioned methods as described in U.S. Pat. Nos. 3,306,874; 3,306,875; 3,257,357 and 3,257,358, and JP-A-50-51197 and 63-152628.

With respect to the polyphenylene ether which can be used in the present invention, the reduced viscosity ($\eta$sp/c) thereof is preferably in the range of from 0.15 to 0.70 dl/g, more preferably from 0.20 to 0.60 dl/g, further preferably from 0.40 to 0.55 dl/g, as measured at 30° C. with respect to a 0.5 g/dl chloroform solution of the polyphenylene ether).

In the present invention, a mixture of two or more different types of polyphenylene ethers having different reduced viscosities can be used without causing any problems. As examples of such a mixture, there can be mentioned a mixture of a polyphenylene ether having a reduced viscosity of 0.45 dl/g or less and a polyphenylene ether having a reduced viscosity of 0.50 dl/g or more, and a mixture of a low molecular weight polyphenylene ether having a reduced viscosity of 0.40 dl/g or less and a polyphenylene ether having a reduced viscosity of 0.50 dl/g or more, but the polyphenylene ether mixtures are not limited to those which are exemplified above.

The polyphenylene ether which can be used in the present invention may contain less than 5% by weight of an organic solvent, relative to 100 parts by mass of the polyphenylene ether, wherein the organic solvent is the residual polymerization solvent used for producing the polyphenylene ether. It is difficult to remove the residual polymerization solvent completely in the drying step after the polymerization, and the solvent usually remains in the polyphenylene ether in a concentration of several hundred ppm to several %. The organic solvent mentioned herein, which is the residual polymerization solvent, may be at least one solvent selected from the group consisting of toluene, isomers of xylene, ethylbenzene, alcohols having 1 to 5 carbon atoms, chloroform, dichloromethane, chlorobenzene and dichlorobenzene.

Further, the polyphenylene ether which can be used in the present invention may be in a modified form or may be in the form of a mixture of an unmodified polyphenylene ether and a modified polyphenylene ether.

In the present invention, the "modified polyphenylene ether" means a polyphenylene ether which is modified with at least one modifier compound having at least one unsaturated bond selected from the group consisting of a carbon-carbon double bond and a carbon-carbon triple bond and having at least one group selected from the group consisting of a carboxylic acid group, an acid anhydride group, an amino group, a hydroxyl group and a glycidyl group.

As examples of the methods for producing the modified polyphenylene ether, there can be mentioned the following methods (1) to (3):
(1) a method in which polyphenylene ether is reacted with a modifier compound in either the presence or absence of a radical initiator at a reaction temperature which is 100° C. or higher and lower than the glass transition temperature of the polyphenylene ether, so that the reaction proceeds without causing the melting of the polyphenylene ether;
(2) a method in which a polyphenylene ether and a modifier compound are melt-kneaded in either the presence or absence of a radical initiator at a temperature which is equal to or higher than the glass transition temperature of the polyphenylene ether and not higher than 360° C., to thereby perform a reaction; and
(3) a method in which a polyphenylene ether and a modifier compound are reacted in a solvent therefor in either the presence or absence of a radical initiator at a temperature which is lower than the glass transition temperature of the polyphenylene ether. In the present invention, any of the above-mentioned methods (1) to (3) can be employed, but the method (1) and/or (2) is preferred.

Next, a specific explanation is made on the above-mentioned modifier compound having at least one unsaturated bond selected from the group consisting of a carbon-carbon double bond and a carbon-carbon triple bond and having at least one group selected from the group consisting of a carboxylic acid group, an acid anhydride group, an amino group, a hydroxyl group and a glycidyl group.

Examples of modifier compounds having a carbon-carbon double bond and a carboxylic acid group and/or an acid anhydride group include unsaturated dicarboxylic acids such as maleic acid, fumaric acid, chloromaleic acid, cis-4-cyclohexene-1,2-dicarboxylic acid and acid anhydrides thereof. In particular, fumaric acid, maleic acid and maleic anhydride are preferred, and fumaric acid and maleic anhydride are especially preferred.

Further, it is also possible to use a compound which is obtained by esterifying one or two carboxyl groups of any of the above-mentioned unsaturated dicarboxylic acids.

Examples of modifier compounds having a carbon-carbon double bond and a glycidyl group include allylglycidyl ether, glycidyl acrylate, glycidyl methacrylate and epoxidized natural oils and fats. Among the above-mentioned compounds, glycidyl acrylate and glycidyl methacrylate are especially preferred.

Examples of modifier compounds having a carbon-carbon double bond and a hydroxyl group include unsaturated alcohols represented by the formula: $C_nH_{2n-3}OH$ (wherein n is a positive integer) such as allyl alcohol, 4-penten-1-ol and 1,4-pentadien-3-ol; and unsaturated alcohols represented by the formulae: $C_nH_{2n-5}OH$ and $C_nH_{2n-7}OH$ (wherein n is a positive integer).

The above-mentioned modifier compounds may be used individually or in combination.

The amount of the modifier compound used for producing the modified polyphenylene ether is preferably 0.1 to 10 parts by mass, more preferably 0.3 to 5 parts by mass relative to 100 parts by mass of the polyphenylene ether.

When a modified polyphenylene ether is produced by using a radical initiator, the radical initiator is preferably used in amount of 0.001 to 1 part by mass relative to 100 parts by mass of the polyphenylene ether.

It is preferred that the amount of modifier compound incorporated into the modified polyphenylene ether is 0.01 to 5% by weight, more preferably 0.1 to 3% by weight, based on the weight of the modified polyphenylene ether.

The modified polyphenylene ether may contain an unreacted modifier compound and/or a polymer of the modifier compound.

Any of conventional additives which can be used for a polyphenylene ether can be added to the conductive resin composition in an amount of less than 10 parts by mass relative to 100 parts by mass of the polyphenylene ether.

Further, the conductive resin composition of the present invention may contain an elastomer.

Examples of the elastomer which can be used in the present invention include an aromatic vinyl compound/conjugated diene block copolymer comprising a polymer block composed mainly of aromatic vinyl monomer units and a polymer block composed mainly of conjugated diene monomer units, a hydrogenation product thereof, an ethylene/α-olefin copolymer, a polyester elastomer, a polyamide elastomer, and natural rubber. Among others, an aromatic vinyl compound/conjugated diene block copolymer, a hydrogenation product thereof, and an ethylene/α-olefin copolymer can be suitably used.

Specific examples of aromatic vinyl compounds used for producing the aromatic vinyl compound/conjugated diene block copolymer used in the present invention include styrene, α-methyl styrene and vinyl toluene. These compounds can be used individually or in combination. Among the above-exemplified compounds, styrene is especially preferred.

Specific examples of conjugated dienes used for producing the aromatic vinyl compound/conjugated diene block copolymer used in the present invention include butadiene, isoprene, piperylene and 1,3-pentadiene. These compounds can be used individually or in combination. Among the above-exemplified compounds, preferred are butadiene, isoprene and a mixture thereof.

With respect to the microstructure of a soft segment (composed of the conjugated diene monomer units) of the above-mentioned block copolymer, it is preferred that the 1,2-vinyl bond content or the total content of the 1,2-vinyl bond and the 3,4-vinyl bond is 5 to 80%, more preferably 10 to 50%, most preferably 10 to 40%.

It is preferred that the block copolymer in the present invention has a block configuration selected from the group consisting of A-B, A-B-A and A-B-A-B, wherein A represents an aromatic vinyl polymer block and B represents a conjugated diene polymer block. Among the above-mentioned block configurations, A-B-A and A-B-A-B are preferred. The block copolymer can be a mixture of different block copolymers having the above-mentioned block configurations.

Further, it is preferred that the aromatic vinyl compound/conjugated diene block copolymer used in the present invention is a hydrogenated block copolymer. The "hydrogenated block copolymer" herein means a copolymer which is obtained by hydrogenating any of the above-mentioned aromatic vinyl compound/conjugated diene block copolymers wherein the degree of hydrogenation of the aliphatic double bonds in the conjugated diene polymer block is more than 0% and up to 100%. The degree of hydrogenation of the hydrogenated block copolymer is preferably 50% or more, more preferably 80% or more, most preferably 98% or more.

A mixture of an unhydrogenated block copolymer and a hydrogenated block copolymer can be used without causing any problem.

Further, the block copolymer of the present invention may be previously mixed with an oil composed mainly of paraffin. The previous addition of an oil composed mainly of paraffin to the block copolymer leads to the improvement in the processability of the composition.

The amount of the oil contained in the block copolymer is preferably 1 to 70 parts by mass relative to 100 parts by mass of the block copolymer in consideration of the handling properties of the block copolymer.

In the present invention, the oil composed mainly of paraffin means a mixture of hydrocarbon compounds having a weight average molecular weight of from 500 to 10,000, which mixture comprises an aromatic ring-containing compound, a naphthenic ring-containing compound and a paraffin compound, wherein the content of the paraffin compound is 50% by weight or more. It is preferred that the oil contains 50 to 90% by weight of a paraffin compound, 10 to 40% by weight of a naphthenic ring-containing compound and 5% by weight or less of an aromatic ring-containing compound.

Such an oil composed mainly of paraffin is commercially available. For example, there can be mentioned PW 380 manufactured by Idemitsu Kosan Co., Ltd.

The above-mentioned aromatic vinyl compound/conjugated diene block copolymer may be a mixture of different block copolymers so long as each of the block copolymers does not adversely affect the scope of the present invention. For example, the block copolymer may be a mixture of block copolymers having different block configurations, a mixture of block copolymers containing different aromatic vinyl monomer units, a mixture of block copolymers containing different conjugated diene monomer units, a mixture of block copolymers having different 1,2-vinyl bond contents or different total contents of 1,2-vinyl bond and 3,4-vinyl bond, a mixture of block copolymers having different aromatic vinyl monomer unit contents, and a mixture of block copolymers having different degrees of hydrogenation.

As a specific example of ethylene-α-olefin copolymers which can be used in the present invention, there can be mentioned one which is described in JP-A-2001-302911.

Further, the elastomer which can be used in the present invention may be a modified elastomer or a mixture of a modified elastomer and an unmodified elastomer.

The modified elastomer mentioned herein means an elastomer which is modified with at least one modifier compound having at least one unsaturated bond selected from the group consisting of a carbon-carbon double bond and a carbon-carbon triple bond and having at least one group selected from the group consisting of a carboxylic acid group, an acid anhydride group, an amino group, a hydroxyl group and a glycidyl group.

As examples of methods for producing the modified elastomer, there can be mentioned the following methods (1) to (3):
(1) a method in which an elastomer and a modifier compound are melt-kneaded in either the presence or absence of a radical initiator at a reaction temperature which is not lower than the softening temperature of the elastomer and not higher than 250° C., to thereby perform a reaction;
(2) a method in which an elastomer and a modifier compound are reacted in a solvent therefor in either the presence or absence of a radical initiator at a temperature which is not higher than the softening temperature of the elastomer; and
(3) a method in which an elastomer is reacted with a modifier compound in either the presence or absence of a radical initiator at a reaction temperature which is not higher than the softening temperature of the elastomer without causing the melting of the same. Any one of the above-mentioned methods (1) to (3) can be employed, but method (1) is preferred, and method (1) performed in the presence of a radical initiator is most preferred.

As the above-mentioned modifier compound having at least one unsaturated bond selected from the group consisting of a carbon-carbon double bond and a carbon-carbon triple bond and having at least one group selected from the group consisting of a carboxylic acid group, an acid anhydride group, an amino group, a hydroxyl group and a glycidyl group, any of those which are exemplified above as the modifier compound used for modifying a polyphenylene ether can be used.

In the conductive resin composition of the present invention, an additional amount of polyamide may be used optionally. Any polyamide usable in the conductive masterbatch can be used for the additional amount of polyamide. Further, the additional polyamide may be the same as or different from the polyamide used in the conductive masterbatch.

It is preferred that the conductive resin composition of the present invention contains 30 to 70 parts by mass of a polyamide, 20 to 50 parts by mass of a polyphenylene ether and 5 to 30 parts by mass of an elastomer, relative to 100 parts by mass of the total of the polyamide, polyphenylene ether and elastomer. It is more preferred that the conductive resin composition of the present invention contains 40 to 60 parts by mass of the polyamide, 30 to 40 parts by mass of the polyphenylene ether and 5 to 15 parts by mass of the elastomer, relative to 100 parts by mass of the total of the polyamide, polyphenylene ether and elastomer.

Further, the conductive resin composition of the present invention contains 0.1 to 4.0 parts by mass, more preferably 0.5 to 3.0 parts by mass, most preferably 1.0 to 2.5 parts by mass of a conductive filler, relative to 100 parts by mass of the total of the polyphenylene ether, polyamide and elastomer.

Further, in the present invention, a compatibility agent can be incorporated into the conductive resin composition during the production thereof. In general, a compatibility agent is used mainly for the purpose of improving the physical properties of a polyamide-polyphenylene ether alloy. The compatibility agent which can be used in the present invention is a multifunctional compound which interacts with one or both of the polyphenylene ether and the polyamide.

In any case, the resulting composition desirably exhibits improved compatibility.

Examples of compatibility agents which can be used in the present invention include those which are described in JP-A-8-48869 and JP-A-9-124926. All of the conventional compatibility agents described in these patent documents can be used in the present invention, and the compatibility agents can be used individually or in combination. Among various conventional compatibility agents, especially preferred are maleic acid, maleic anhydride and citric acid.

The amount of the compatibility agent used in the present invention is preferably 0.1 to 5 parts by mass, more preferably 0.1 to 2 parts by mass, relative to 100 parts by mass of a mixture of the polyamide and the polyphenylene ether.

In the present invention, in addition to the above-mentioned components, if desired, an additional component(s) can be added to the conductive resin composition so long as the additional component(s) does not adversely affect the effect of the present invention.

The additional components are exemplified below.

The additional component(s) is one or more selected from the group consisting of other thermoplastic resins such as polyester and polyolefin; inorganic fillers (such as talc, kaolin, xonotlite, wollastonite, titanium oxide, potassium titanate and glass fiber); conventional adhesion modifiers which enhance the affinity between an inorganic filler and a resin; flame retardants (such as a halogenated resin, a silicone flame retardant, magnesium hydroxide, aluminum hydroxide, an organic phosphoric ester compound, ammonium polyphosphate and red phosphorus); fluororesins having an effect to prevent dripping; plasticizers (such as an oil, a low molecular weight polyolefin, a polyethylene glycol and a fatty ester); auxiliary flame retardants such as antimony trioxide; coloring agents; antistatic agents; various peroxides; zinc oxide; zinc sulfide; antioxidants; ultraviolet absorbers; and light stabilizers.

Specifically, the amount of the additional component(s) added to the resin composition is not more than 100 parts by mass, relative to 100 parts by mass of the total mass of the thermoplastic resin and the carbonaceous filler.

Specific examples of processing apparatuses which can be used to prepare the conductive resin composition of the present invention include a twin-screw extruder and a kneader. Among these apparatuses, preferred is a twin-screw extruder, and in particular, most preferred is a twin-screw extruder equipped with an inlet at an upstream portion and at least one inlet formed in the downstream of the inlet at an upstream portion.

With respect to the melt-kneading temperature used for producing the resin composition, there is no particular limitation. In general, an appropriate temperature for obtaining a desired resin composition is selected from the range of from 240 to 360° C.

An example of preferred methods for producing the conductive resin composition of the present invention is a method comprising the steps of: (1) producing the conductive masterbatch using a twin-screw extruder equipped with inlets at least at three places, an upstream portion, an intermediated portion, and a downstream portion, of the extruder, wherein a first polyamide resin is fed through the inlet at an upstream portion to melt the first polyamide resin; then, a carbonaceous filler is fed through the inlet at an intermediate portion to knead the filler and the first polyamide resin together; and then, a second polyamide is added from the inlet at a downstream portion to melt-knead the second polyamide, the carbonaceous filler, and the first polyamide together; and (2) adding the resulting conductive masterbatch (solid) to a molten polyphenylene ether.

The step (2) in the above-mentioned production method also includes a method of using a twin-screw extruder equipped with an inlet at an upstream portion and an inlet at a downstream portion, wherein a polyphenylene ether is fed through the inlet at an upstream portion to melt-knead the same; and then, a conductive masterbatch and an additional amount of polyamide are fed through the inlet at a downstream portion to melt-knead all the components together. In this case, it is preferred that the conductive masterbatch and polyamide are simultaneously added to the molten polyphenylene ether.

The conductive resin composition thus obtained can be molded into various molded articles by various conventional methods, such as injection molding.

The conductive resin composition of the present invention is suitable for producing various molded articles, for example, parts for electrical or electronic appliances such as an IC tray, and a chassis and cabinet of various disc players; parts for office automation machines such as various computers and peripheral equipment therefor; mechanical parts; parts for motorcycles such as a cowl; exterior parts for automobiles such as a fender, a door panel, a front panel, a rear panel, a locker panel, a rear bumper panel, a back door garnish, an emblem garnish, a panel for a feeding port of a fuel, an over fender, an outer door handle, a door mirror housing, a bonnet air intake, a bumper, a bumper guard, a roof rail, a roof rail leg, a pillar, a pillar cover, a wheel cover, various aero parts (such as a spoiler), various moles and emblems for an automobile; and interior parts for automobiles such as an instrument panel, a console box and a trim. Among the above-exemplified molded articles, the conductive resin composition of the present invention is suitable for producing an automobile outer panel, which is subjected to an electrostatic coating.

EXAMPLES

Hereinbelow, the present invention will be described in more detail with reference to the following Examples and Comparative Examples.

(Raw Materials Used)

(1-1) Polyamide 6 pellet (hereinafter, may be abbreviated to "PA6-1")

Unitika nylon A1020BRL (manufactured by Unitika, Ltd.)

(1-2) Polyamide 6 powder (hereinafter, may be abbreviated to "PA6-2")

Unitika nylon A1020LP (manufactured by Unitika, Ltd.)

(2-1) Polyamide 66 (hereinafter, may be abbreviated to "PA66-1")

Viscosity number: 120 (measured in 96% sulfuric acid according to ISO 307)

Concentration of terminal amino groups: 20 micromol/g

Concentration of terminal carboxyl groups: 110 micromol/g

Pellet shape: Average pellet length: 3 mm, Average diameter of pellet cross-section: 2 mm Water content: 1,500 ppm (determined at a furnace temperature of 185° C. using a Karl Fischer water determination device)

(2-2) PA66-1 was melted in the ZSK40MC extruder set at 280° C. and pelletized using a fan-cutter pelletizer (manufactured by Hoshi Plastic Co., Ltd.) after adjusting the speed of rotation of the teeth and the speed of rollers to obtain polyamide pellets having an average pellet length of 3 mm and an average diameter of pellet cross-section of 2 mm. The water content of the pellets was determined to be about 3,500 ppm (hereinafter, may be abbreviated to "PA66-2").

(2-3) PA66-2 was vacuum dried at 100° C. for 24 hours. The water content was determined to be about 450 ppm (hereinafter, may be abbreviated to "PA66-3").

(2-4) PA66-1 was melted in the ZSK40MC extruder set at 280° C. and pelletized using a fan-cutter pelletizer (manufactured by Hoshi Plastic Co., Ltd.) after adjusting the speed of rotation of the teeth and the speed of rollers to obtain polyamide pellets having an average pellet length of 6 mm and an average diameter of pellet cross-section of 2 mm. The polyamide pellets obtained was dried by hot air at 120° C. for about 4 hours. The water content of the pellets was determined to be about 1,200 ppm (hereinafter, the polyamide obtained may be abbreviated to "PA66-4").

(2) Carbonaceous filler: carbon black (hereinafter, may be abbreviated to "CB")

Trade name: Ketchen black EC-600JD (manufactured by Ketchen Black International Co.)

(3) Polyphenylene ether (hereinafter, abbreviated to "PPE")
Poly(2,6-dimethyl-1,4-phenylene ether)
Reduced viscosity: 0.42 dl/g (measured at 30° C. using a 0.5 g/dl chloroform solution of PPE)

(4) Elastomer (hereinafter, may be abbreviated to "SEBS")
Trade name: Kraton G1651 (manufactured by Kraton Polymers LLC)

(5) Maleic anhydride (hereinafter, may be abbreviated to "MAH")
Trade name: CRYSTAL MAN AB (manufactured by NOF Corporation)

[Measuring Methods]

<Amount of Die Drips Formed>

In order to produce a polyamide masterbatch, the extruder was continuously operated for 1 hour. The number of die drips which are formed at the extruder die lip and have grown to a length of 5 mm or more during the operation was counted. Note that the die drips which dropped from the die lip during the operation were also included in the number.

<Occurrence Frequency of Strand Breakage>

Similarly, the extruder was continuously operated for 1 hour and the number of broken strands during the operation was measured. When any strand was broken, pelletizing was immediately interrupted and started again from a stationary state (a state where all the strands are cut after passing through a water bath).

<Resin Temperature During Extrusion>

Similarly, the temperature of the strand-shaped molten resin which came out of the die lip after 1-hour continuous operation of the extruder was measured with a contact thermocouple.

<Maximum Stable Output of Extruding>

In order to compare the difference in productivity due to the difference in production methods, the output of extruding was measured and compared in the case when the motor torque of the extruder for producing a polyamide masterbatch was a specific value (here, 85% motor torque: a value when the extruder motor rated current value is defined as 100%).

<Conductivity of Strand>

A strand of about 10 cm was collected, and the ends of the strand were broken under liquid nitrogen, obtaining a strand for measurement having a length of about 5 cm. The cut surfaces at the ends of this strand were coated with silver paste and sufficiently dried. Then, the resistance between the strand ends was measured by using a digital insulation resistance tester [DG525: manufactured by Sanwa Electric Instrument Co., Ltd.] and setting the voltage at 500 V, and a volume resistivity was calculated using the following formula:

$$\text{Volume resistivity } (\Omega\cdot\text{cm}) = \text{resistance } (\Omega) \times \text{cross-sectional area } (\text{cm}^2) \div \text{length } (\text{cm})$$

The measurement was performed on 3 strands, and the average of the results was defined as the conductivity of strand.

<Foreign Matter on the Surface of Molded Piece>

The number of foreign matter particles having a major axis of 1 mm or more was counted, wherein the foreign matter particles are on both the top and back surfaces of a plate-shaped molded piece of 90 mm in length, 50 mm in width, and 2.5 mm in thickness. The measurement was performed on 5 molded pieces, and the average of the results was defined as the number of foreign matter particles.

The plate-shaped molded piece was molded using an injection molding machine [IS-80EPN: manufactured by Toshiba Machine Co., Ltd.]. At this time, the mold temperature was set at 80° C., and the cylinder temperatures were set at 290° C.-290° C.-280° C.-270° C. from the nozzle to the hopper side. The injection pressure was set at the minimum injection pressure that can fill a tensile test specimen (ASTM D638 type I dumbbell bar) when the injection speed and the mold and cylinder temperatures were set at specific levels (the minimum injection pressure required to fill the tensile test specimen). The molding cycle consisted of 10 seconds of injection, 15 seconds of cooling, and 2 seconds of the interval.

<Volume Resistivity of Molded Piece>

A strip test specimen was obtained which has a length of 50 mm and a cut surface of a uniform cross-sectional area (12.4× 3.2 mm) at the ends by breaking the ends of a tensile test specimen of 3.2 mm in thickness (ASTM D638 type I dumbbell bar). Breaking of the test specimen was performed in a manner where a test specimen previously scored with a cutter knife was immersed in liquid nitrogen for 1 hour and then broken. The cut surfaces at the ends of this test specimen were coated with silver paste and then sufficiently dried. Then, the resistance between the ends was measured using the above resistance tester by setting the voltage at 500 V, and a volume resistivity was calculated using the following formula:

$$\text{Volume resistivity } (\Omega\cdot\text{cm}) = \text{resistance } (\Omega) \times \text{cross-sectional area } (\text{cm}^2) \div \text{length } (\text{cm})$$

The measurement was performed on 5 different test specimens, and the average of the results was defined as the volume resistivity.

The tensile test specimen was molded using an injection molding machine [IS-80EPN: manufactured by Toshiba Machine Co., Ltd.]. At this time, the mold temperature was set at 80° C., and the cylinder temperatures were set at 290° C.-290° C.-280° C.-270° C. from the nozzle to the hopper side. The injection pressure was set at the minimum injection pressure that can fill a tensile test specimen (ASTM D638 type I dumbbell bar) when the injection speed and the mold and cylinder temperatures were set at specific levels (the minimum injection pressure required to fill the tensile test specimen)+5 kgf/cm². The molding cycle consisted of 10 seconds of injection, 15 seconds of cooling, and 2 seconds of the interval.

Examples 1 and 2

There was prepared a TEM58SS extruder (manufactured by Toshiba Machine Co., Ltd.) having inlets at least at three places, an upstream portion, an intermediate portion, and a downstream portion, of the extruder, and an open vent equipped in the further downstream of the inlet at a downstream portion. As a screw configuration of the extruder, one kneading zone was provided between the inlet at an upstream portion and the inlet at an intermediate portion, and two kneading zones were provided between the inlet at a downstream portion and a place just before a die. The cylinder temperature of the extruder between the inlet at an upstream portion and a place just before the inlet at an intermediate portion was set at 280° C.; the cylinder temperature between the inlet at an intermediate portion and a place immediately before the die was set at 260° C.; and the temperature of the die was set at 330° C.

At a proportion given in Table 1, 50 parts by mass of PA66-1 were fed through the inlet at an upstream portion, 10 parts by mass of CB from the inlet at an intermediate portion, and 40 parts by mass of the same PA66-1 from the inlet at a downstream portion, respectively, and the extrusion was performed at a speed of rotation of the screws of 500 rpm. At this time, the number of the strands was set at 14. The strand-shaped molten resin which came out of the die was passed through a water bath and cut in the pelletizer, thus obtaining pellets.

It was observed that the first polyamide fed at the upstream portion was completely melted at a place immediately before the inlet at an intermediate portion. Examples 1 and 2 differ only in the output of extruding. The output of extruding is 150 kg/h in Example 1 and 300 kg/h in Example 2.

During 1-hour extrusion, no strand breakage occurred at all, and the extrusion was very favorable. In addition, almost no formation of die drips was observed. The resin temperature, the torque during extrusion, and the conductivity of the strand were measured, respectively, and the results are shown together in Table 1.

Next, the output of extruding was increased in order to measure the maximum stable output of extruding. When the output of extruding was increased to about 420 kg/h, it became unable to feed CB because the output of extruding exceeded the capacity of the forced feeder installed at the inlet at an intermediate portion. Consequently, this value was defined as the maximum stable output of extruding. The torque of the extruder motor at this time was 75%.

Examples 3 to 5

These Examples were carried out in substantially the same manner as in Example 2 except that the ratio of the polyamide fed through the inlet at an upstream portion to that fed through the inlet at a downstream portion was changed to the ratios given in Table 1. In Example 3, strand breakage did not occur, and the extrusion was favorable. However, a formation of some die drips was observed at the die lip part. Further, in Examples 4 and 5, a phenomenon was observed in which the torque and resin temperature during extrusion increased, and it was found that the occurrence of strand breakage and formation of die drips tended to increase, as the ratio of the polyamide fed through the inlet at an upstream portion is increased. Furthermore, in Example 3, the maximum stable output of extruding was 420 kg/h which is the feeding limit output of extruding of CB as in Examples 1 and 2, and it was impossible to measure the output of extruding at the 85% torque. On the other hand, in Examples 4 and 5, it was possible to measure the maximum stable output of extruding since the 85% torque was less than 420 kg/h which is the feeding limit output of extruding of CB. The maximum stable output of extrudings in Examples 4 and 5 were 400 kg/h and 350 kg/h, respectively.

Example 6

This Example was carried out in substantially the same manner as in Example 3 except that the polyamide fed through the inlet at a downstream portion was changed to PA66-4. Also at this time, a phenomenon was observed in which the resin temperature was higher by about 10° C. than those in Examples 1 to 3. A phenomenon observed in which the strand was broken once during the 1-hour extrusion. This is supposed to be due to the influence of the resin temperature. The number of die drips was almost the same as in Example 3.

Note that, in Example 6, the maximum stable output of extruding was not measured since it seems to be almost the same as in Example 3.

Example 7

This Example was carried out in substantially the same manner as in Example 2 except that the ratio of the polyamide fed through the inlet at an upstream portion and that fed through the inlet at a downstream portion was changed to the ratio given in Table 1. Strand breakage did not occur at this time either, and the extrusion was favorable. However, an unusual rubbing sound was generated from the extruder.

TABLE 1

| | Unit | Ex. 1 | Ex. 2 | Ex. 3 | Ex. 4 | Ex. 5 | Ex. 6 | Ex. 7 |
|---|---|---|---|---|---|---|---|---|
| Loaded through upstream inlet | | | | | | | | |
| PA66-1 | part by weight | 50 | 50 | 60 | 70 | 80 | 60 | 40 |
| Loaded through intermediate inlet | | | | | | | | |
| CB | part by weight | 10 | 10 | 10 | 10 | 10 | 10 | 10 |
| Loaded through downstream inlet | | | | | | | | |
| PA66-1 | part by weight | 40 | 40 | 30 | 20 | 10 | | 50 |
| PA66-4 | part by weight | | | | | | 30 | |
| Discharge rate capability for stable production | kg/h | 420 or more | 420 or more | 420 or more | 400 | 350 | Not measured | Not measured |
| Extrusion discharge rate | kg/h | 150 | 300 | 300 | 300 | 300 | 300 | 300 |
| Extruder motor torque | % | 48 | 59 | 62 | 67 | 74 | 69 | 58 |
| Resin temperature at die | ° C. | 331 | 327 | 328 | 337 | 344 | 339 | 330 |
| Number of die drips | piece | 0 | 0 | 2 | 3 | 5 | 3 | 0 |

TABLE 1-continued

|  | Unit | Ex. 1 | Ex. 2 | Ex. 3 | Ex. 4 | Ex. 5 | Ex. 6 | Ex. 7 |
|---|---|---|---|---|---|---|---|---|
| Number of times of strand breakage | number of times | 0 | 0 | 0 | 1 | 2 | 1 | 0 |
| Conductivity of strand | Ω·cm | 3.6 | 3.8 | 3.7 | 3.5 | 4.1 | 3.9 | 3.6 |

Example 8

This Example was carried out in the same manner as in Example 2 except that the polyamide fed through the inlets at an upstream portion and at a downstream portion was changed to PA66-2. Strand breakage occurred 4 times during 1-hour extrusion. A possibility was suggested that higher productivity could be achieved because the torque was lower than that in Example 2 by about 10%. However, the limit of the output of extruding was 360 kg/h because the surface roughness of the strand which is supposedly due to a poor dispersion of the conductive filler occurred in the process to increase the output of extruding in order to measure the maximum stable output of extruding. The results are described in Table 2 together with compositions.

Example 9

This Example was carried out in the same manner as in Example 2 except that the polyamide fed through the inlets at an upstream portion and at a downstream portion was changed to PA66-3. Strand breakage did not occur during 1-hour extrusion, but a formation of die drips was observed in an amount more than that in Example 2. Further, the torque and the resin temperature were higher than those in Example 2. A limit of the maximum stable output of extruding was 350 kg/h because the formation of die drips became intense. The results are described in Table 2 together with compositions.

Examples 10 and 11

These Examples were carried out in the same manner as in Example 2 except that the polyamide fed through the inlet at a downstream portion was changed to PA6-1 or PA6-2 as described in Table 2.

With respect to Example 10, no strand breakage occurred at all during 1-hour extrusion, and the extrusion was very favorable. In addition, almost no formation of die drips was observed. The resin temperature, the torque during extrusion, and the conductivity of the strand were measured, respectively, and the results are shown together in Table 2. Further, the maximum stable output of extruding was 420 kg/h because it became unable to feed CB as in Examples 1 and 2.

With respect to Example 11, the extrusion was carried out satisfactorily, but a phenomenon was observed in which the torque greatly varied. This is supposedly caused by a flushing phenomenon (phenomenon in which powder flows out at a stroke) occurred within the feeder for feeding PA6-1 to thereby cause the feed to vary. The maximum stable output of extruding was not measured because the torque during the extrusion was not stable.

The results are described in Table 2 together with compositions.

TABLE 2

|  | Unit | Ex. 8 | Ex. 9 | Ex. 10 | Ex. 11 |
|---|---|---|---|---|---|
| Loaded through upstream inlet |  |  |  |  |  |
| PA66-1 | part by weight |  |  | 50 | 50 |
| PA66-2 | part by weight | 50 |  |  |  |
| PA66-3 | part by weight |  | 50 |  |  |
| Loaded through intermediate inlet |  |  |  |  |  |
| CB | part by weight | 10 | 10 | 10 | 10 |
| Loaded through downstream inlet |  |  |  |  |  |
| PA66-2 | part by weight | 40 |  |  |  |
| PA66-3 | part by weight |  | 40 |  |  |
| PA6-1 | part by weight |  |  | 40 |  |
| PA6-2 | part by weight |  |  |  | 40 |
| Discharge rate capability for stable production | kg/h | 360 | 350 | 420 or more | Not measured |
| Extrusion discharge rate | kg/h | 300 | 300 | 300 | 300 |
| Extruder motor torque | % | 50 | 65 | 52 | 51-62 |
| Resin temperature at die | °C. | 328 | 334 | 325 | 334 |
| Number of die drips | piece | 0 | 7 | 0 | 1 |
| Number of times of strand breakage | number of times | 3 | 0 | 0 | 0 |
| Conductivity of strand | Ω·cm | 4.1 | 3.3 | 3.8 | 3.0 |

Comparative Examples 1 to 4

The same extruder as in Example 1 was used, and the raw materials were fed at a proportion given in Table 1 to carry out extrusion. The results are shown together in Table 3. In Comparative Example 3, it became impossible to draw strands stably, and although there was sufficient margin in the torque, the maximum stable output of extruding was 200 kg/h.

and one inlet at a downstream portion, the resins in the proportions given in Table 4 were fed by setting the temperature between the inlet at an upstream portion and a place immediately before the inlet at a downstream portion at 320° C., the temperature between the inlet at a downstream portion and a place immediately before the die at 280° C., and the temperature of the die at 300° C.; and setting the speed of rotation of the screw at 500 rpm to obtain the conductive resin compositions. The extruder was operated under conditions as described in Table 4, and the torque, the resin temperature at a die, the foreign matter on the surface of the molded pieces, and the volume resistivity of the molded pieces were measured. The results are shown together in Table 4.

TABLE 3

|  | Unit | Comp. Ex. 1 | Comp. Ex. 2 | Comp. Ex. 3 | Comp. Ex. 4 |
|---|---|---|---|---|---|
| Loaded through upstream inlet |  |  |  |  |  |
| PA66-1 | part by weight | 90 | 90 | 90 | 50 |
| CB | part by weight | 10 |  |  |  |
| Loaded through intermediate inlet |  |  |  |  |  |
| PA66-1 | part by weight |  |  |  | 40 |
| CB | part by weight |  | 10 |  | 10 |
| Loaded through downstream inlet |  |  |  |  |  |
| CB | part by weight |  |  | 10 |  |
| Discharge rate capability for stable production | kg/h | 165 | 185 | 200 | 320 |
| Extrusion discharge rate | kg/h | 150 | 150 | 150 | 300 |
| Extruder motor torque | % | 82 | 73 | 52 | 78 |
| Resin temperature at die | ° C. | 352 | 356 | 356 | 345 |
| Number of die drips | piece | 12 | 15 | 10 | 5 |
| Number of times of strand breakage | number of times | 8 | 10 | 5 | 0 |
| Conductivity of strand | $\Omega \cdot cm$ | 10 | 8.5 | 5.0 | 4.0 |

Example 12, Comparative Examples 5 and 6

Using the TEM58SS extruder (manufactured by Toshiba Machine Co., Ltd.) which has one inlet at an upstream portion

TABLE 4

|  | Unit | Ex. 12 | Comp. Ex. 5 | Comp. Ex. 6 | Comp. Ex. 7 |
|---|---|---|---|---|---|
| Loaded through upstream inlet |  |  |  |  |  |
| PPE | part by weight | 35 | 35 | 35 | 35 |
| MAH | part by weight | 0.2 | 0.2 | 0.2 | 0.2 |
| SEBS | part by weight | 12 | 12 | 12 | 12 |
| Loaded through downstream inlet |  |  |  |  |  |
| $PA_{(pellet)}$-S | part by weight | 33 | 33 | 33 | 33 |
| Masterbatch in Example 2 | part by weight | 20 |  |  |  |
| Masterbatch in Comparative Example 1 | part by weight |  | 20 |  |  |
| Masterbatch in Comparative Example 2 | part by weight |  |  | 20 |  |
| Masterbatch in Comparative Example 4 | part by weight |  |  |  | 20 |
| Extrusion discharge rate | kg/h | 500 | 500 | 500 | 500 |
| Extruder motor torque | % | 72 | 73 | 75 | 76 |
| Resin temperature at die | ° C. | 321 | 323 | 321 | 325 |
| Foreign matter on molded piece surface | piece | 0 | 15 | 10 | 8 |
| Volume resistivity of molded piece | $10^4 \, \Omega \cdot cm$ | 4.8 | 7.5 | 6.0 | 5.8 |

INDUSTRIAL APPLICABILITY

The present invention can provide a conductive masterbatch which can suppress an increase in resin temperature during extrusion, a formation of die drips, and strand breakage and can also significantly increase the output of extruding. The resin composition produced by using a method for producing the conductive masterbatch can be used in a wide variety of fields, such as electric and electronic parts, parts of office automation machines, automobile parts and other mechanical parts. Especially, the above conductive resin composition is very advantageous for producing an automobile outer panel (e.g., an automobile fender).

The invention claimed is:

1. A method for producing a conductive resin composition comprising a polyamide resin, a polyphenylene ether and a carbonaceous filler comprising the steps of:
   (1) producing a conductive masterbatch in which 8 to 15% by weight of the carbonaceous filler is incorporated relative to the total weight of the conductive masterbatch, characterized by comprising a first step of melt-kneading a first polyamide and the carbonaceous filler to form a melt-kneaded product and a second step of melt-kneading the melt-kneaded product and a second polyamide, in this order, and
   (2) melting the polyphenylene ether; and adding the conductive masterbatch obtained in the step of (1) and the additional amount of polyamide simultaneously to the molten polyphenylene ether.

2. The method for producing the conductive resin composition according to claim 1, wherein the first step in the step of (1) comprises the steps of melting the first polyamide and adding the carbonaceous filler to the molten first polyamide to further melt-knead the resulting mixture, in this order.

3. The method for producing the conductive resin composition according to claim 1, characterized in that, in the step of (1), a twin-screw extruder equipped with three respective inlets located at least in the upstream portion, intermediate portion, and downstream portion thereof is used so that a first polyamide resin is fed through the inlet at the upstream portion to melt the first polyamide resin; then, the carbonaceous filler is fed through the inlet at the intermediate portion to knead the carbonaceous filler and the first polyamide resin together; and then, the second polyamide is fed through the inlet at the downstream portion to melt-knead the second polyamide, the carbonaceous filler, and the first polyamide together.

4. The method for producing the conductive resin composition according to claim 3, characterized in that a mixture of the first polyamide, the second polyamide, and the carbonaceous filler is passed through two or more kneading zones provided in the extruder to thereby melt-knead the mixture.

5. The method for producing the conductive resin composition according to claim 3, characterized in that an extruder is used which is equipped with an open vent further downstream of the inlet at the downstream portion for feeding the second polyamide.

6. The method for producing the conductive resin composition according to claim 5, characterized in that both the first polyamide and the second polyamide are in the form of pellets; the second polyamide has an average pellet length of from 1.0 mm to 4.0 mm; and the pellets have an average diameter in cross-section of from 0.5 mm to 3.0 mm.

7. The method for producing the conductive resin composition according to claim 3, characterized in that the conductive masterbatch is produced at the output of extruding of 150 kg/hr or more.

8. The method for producing the conductive resin composition according to claim 1, characterized in that, in the step of (1), an extruder is used which has a screw outside diameter of 40 mm or more.

9. The method for producing the conductive resin composition according to claim 1, wherein the water contents of the first polyamide and the second polyamide are 500 ppm or more and 2,000 ppm or less, respectively in the step of (1).

10. The method for producing the conductive resin composition according to claim 1, characterized in that the quantitative ratio of the first polyamide to the second polyamide is from 9:1 to 4:6.

11. The method for producing the conductive resin composition according to claim 1, characterized in that the terminal amino group/terminal carboxyl group ratio of both the first polyamide and the second polyamide is from 0.1 to 0.6.

12. The method for producing the conductive resin composition according to claim 1, characterized in that the carbonaceous filler is carbon black and/or carbon fibril.

* * * * *